US007202626B2

(12) United States Patent
Jadric et al.

(10) Patent No.: US 7,202,626 B2
(45) Date of Patent: Apr. 10, 2007

(54) VARIABLE SPEED DRIVE FOR A CHILLER SYSTEM WITH A SWITCHED RELUCTANCE MOTOR

(75) Inventors: Ivan Jadric, York, PA (US); Harold Robert Schnetzka, York, PA (US); Stephen Harold Smith, York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 11/123,756

(22) Filed: May 6, 2005

(65) Prior Publication Data

US 2006/0250105 A1 Nov. 9, 2006

(51) Int. Cl.
*H02P 1/46* (2006.01)

(52) U.S. Cl. ...................................... 318/701; 318/254
(58) Field of Classification Search ...................... None
See application file for complete search history.

(56) References Cited

U.S. PATENT DOCUMENTS

| | | | |
|---|---|---|---|
| 3,840,799 A | 10/1974 | Macko et al. | |
| 3,876,326 A | 4/1975 | Weitz | |
| 4,514,991 A | 5/1985 | Zinsmeyer | |
| 4,670,695 A | 6/1987 | Byrne et al. | |
| 4,731,570 A | 3/1988 | Lee | |
| 4,855,652 A * | 8/1989 | Yamashita et al. | 318/268 |
| 4,893,479 A | 1/1990 | Gillett et al. | |
| 4,935,684 A * | 6/1990 | Watanabe | 318/729 |
| 5,010,267 A | 4/1991 | Lipo et al. | |
| 5,072,166 A | 12/1991 | Ehsani | |
| 5,174,130 A | 12/1992 | Lucas | |
| 5,246,349 A | 9/1993 | Hartog | |
| 5,256,923 A | 10/1993 | Bartos et al. | |
| 5,335,507 A | 8/1994 | Powell | |
| 5,423,192 A | 6/1995 | Young et al. | |
| 5,440,218 A | 8/1995 | Oldenkamp | |
| 5,492,273 A * | 2/1996 | Shah | 236/44 A |
| 5,502,630 A | 3/1996 | Rokhvarg | |
| 5,506,487 A | 4/1996 | Young et al. | |

(Continued)

FOREIGN PATENT DOCUMENTS

EP     1 041 289 A2    4/2000

(Continued)

OTHER PUBLICATIONS

S. Bhattacharya, T.M. Frank, D.M. Divan and B. Banerjee, "Active Filter System Implementation", IEEE Industry Applications Magazine, Sep./Oct. 1998; pp. 47-63.

(Continued)

*Primary Examiner*—Lincoln Donovan
*Assistant Examiner*—Renata McCloud
(74) *Attorney, Agent, or Firm*—McNees Wallace & Nurick LLC

(57) ABSTRACT

A variable speed drive with a boost converter is provided for a chiller system driven by a switched reluctance motor. The boost converter can be a diode or thyristor rectifier followed by a boost DC/DC converter or a three-phase pulse width modulated boost converter. The boost converter provides a boosted voltage to the DC link, which results in a boosted voltage being applied to the switched reluctance motor by the inverter of the variable speed drive.

18 Claims, 4 Drawing Sheets

U.S. PATENT DOCUMENTS

| | | | |
|---|---|---|---|
| 5,585,708 A | 12/1996 | Richardson et al. | |
| 5,592,058 A | 1/1997 | Archer | |
| 5,592,059 A | 1/1997 | Archer | |
| 5,652,485 A * | 7/1997 | Spiegel et al. | 318/147 |
| 5,657,638 A | 8/1997 | Erdman et al. | |
| 5,675,231 A | 10/1997 | Becerra et al. | |
| 5,692,385 A | 12/1997 | Hollenbeck et al. | |
| 5,731,649 A | 3/1998 | Caamano | |
| 5,731,681 A * | 3/1998 | Inaniwa et al. | 318/729 |
| 5,793,623 A * | 8/1998 | Kawashima et al. | 363/56.05 |
| 5,793,625 A | 8/1998 | Balogh | |
| 5,814,914 A | 9/1998 | Caamano | |
| 5,828,200 A * | 10/1998 | Ligman et al. | 318/807 |
| 5,905,643 A * | 5/1999 | Gopfrich et al. | 363/41 |
| 5,929,591 A * | 7/1999 | Katou et al. | 318/723 |
| 5,947,854 A | 9/1999 | Kopko | |
| 5,955,861 A | 9/1999 | Jeong et al. | |
| 5,970,733 A * | 10/1999 | Hamaoka et al. | 62/228.4 |
| 5,986,378 A | 11/1999 | Caamano | |
| 6,043,580 A | 3/2000 | Vogel et al. | |
| 6,049,197 A | 4/2000 | Caamano | |
| 6,055,167 A | 4/2000 | Shamkovich et al. | |
| 6,056,518 A | 5/2000 | Allen et al. | |
| 6,075,328 A * | 6/2000 | Notohara et al. | 318/254 |
| 6,104,113 A | 8/2000 | Beifus | |
| 6,112,535 A | 9/2000 | Hollenbeck | |
| 6,154,013 A | 11/2000 | Caamano | |
| 6,193,473 B1 | 2/2001 | Mruk et al. | |
| 6,204,627 B1 * | 3/2001 | Watanabe et al. | 318/729 |
| 6,259,233 B1 | 7/2001 | Caamano | |
| 6,313,600 B1 | 11/2001 | Hammond et al. | |
| 6,367,273 B2 * | 4/2002 | Takagi et al. | 62/230 |
| 6,407,466 B2 | 6/2002 | Caamano | |
| 6,481,652 B2 | 11/2002 | Strutz et al. | |
| 6,616,421 B2 | 9/2003 | Mruk et al. | |
| 6,646,407 B2 | 11/2003 | Rahman et al. | |
| 6,686,718 B2 * | 2/2004 | Jadric et al. | 318/801 |
| 6,784,633 B2 | 8/2004 | Ieoka | |
| 2001/0024075 A1 | 9/2001 | Caamano | |
| 2001/0035018 A1 * | 11/2001 | Takagi et al. | 62/228.4 |
| 2002/0079764 A1 | 6/2002 | Cook | |
| 2002/0145359 A1 | 10/2002 | Nishiyama et al. | |
| 2003/0007369 A1 | 1/2003 | Gilbreth et al. | |
| 2003/0062869 A1 | 4/2003 | Ieoka | |

FOREIGN PATENT DOCUMENTS

| | | |
|---|---|---|
| EP | 1404015 A2 | 3/2004 |
| GB | 2 273 349 A | 6/1994 |
| GB | 2 376 505 A | 12/2002 |
| JP | 2001-128477 A | 5/2001 |
| JP | 2001-186790 | 7/2001 |
| JP | 2002-242872 | 8/2002 |
| WO | 2004/057747 A1 | 7/2004 |

OTHER PUBLICATIONS

Jarso Mulugeta, William Dietrich; "Performance of Variable Speed Centrifugal Chillers", 1996 Purdue Compressor Conference, pp. 755-759.

Thomas G. Habetler, "A Space Vector-Based Rectifier Regulator for AC/DC/AC Converters", IEEE Transactions on Power Electronics, vol. 8, No. 1, Jan. 1993, pp. 30-36.

R.B. Ridley, "Average Small-Signal Analysis of the Boost Power Factor Correction Circuit", Proceedings of the Virginia Power Electronics Center Seminar; 1989; pp. 185-197.

"SR Motors Coming on Strong", Appliance Manufacturer, Oct. 1994, pp. 27-28.

Joe Jancsurak, "Switch to Switched Reluctance?", Appliance Manufacturer, Mar. 1992, pp. 29-31.

* cited by examiner

VARIABLE SPEED DRIVE FOR A CHILLER SYSTEM WITH A SWITCHED RELUCTANCE MOTOR

BACKGROUND OF THE INVENTION

The present invention relates generally to a variable speed drive for a chiller system. More specifically, the present invention relates to a variable speed drive with boost capability for a variable speed chiller system with a switched reluctance motor.

In the past, the induction motors for driving compressors in chiller systems were designed to operate from standard line (main) voltages and frequencies that were available from the power distribution system of the facility where the motor was being operated. The use of line voltages and frequencies typically required the compressors to use some inefficient mechanical means (such as inlet guide vanes for centrifugal compressors and a slide valve for screw compressors) for modulating capacity as a result of the motor being limited to one operating speed that was based on the input frequency to the motor. In addition, if the operating speed of the motor was not equal to the desired operating speed of the compressor, a "step up," or "step down," gearbox was inserted between the motor and the compressor to obtain the desired operating speed of the compressor. Furthermore, motors that required their own controller or electronic drive, e.g., switched reluctance motors, could not be used for these chiller systems, as such motors could not operate directly from standard (main) voltages and frequencies.

Next, variable speed drives (VSDs) were developed that could vary the frequency and/or voltage that was provided to the induction motors of a chiller system. This capability to vary the input frequency and voltage to a motor resulted in an induction motor that was capable of providing a variable output speed and power to the corresponding compressor of the chiller system. The variable speed operation of the motors (and compressors) enabled the chiller system to take advantage of efficiencies that occur during partial loading of the compressors, when operation at a speed lower than full load design speed is desirable. The use of the variable speed drive also permitted the use of other types of motors that required their own electronic drive, e.g., switched reluctance motors, in chiller systems in addition to the previous motors that were capable of operating directly from a three-phase power line, e.g., induction motors or synchronous motors.

One limitation of prior induction motor style VSDs is that the magnitude of the output voltage from the VSD can be no larger than the magnitude of the input, or utility, line voltage to the VSD. This limit on the output voltage occurs because the rectifier of the VSD only provides a DC voltage that is at a magnitude equal to approximately 1.3 times the root mean square (rms) value of the line-to-line AC voltage supplied to the VSD. This limitation on the output voltage of the variable speed drive limits the maximum speed of the conventional induction motor to a speed that corresponds to the speed of the motor operated at line voltage (because of the constant volts/hertz ratio required by a conventional induction motor). To obtain greater compressor speeds, a "step up" gearing arrangement has to be incorporated between the motor and the compressor to increase the output rotational speed of the motor driving the compressor. Alternately, one could use a lower rated voltage motor and operate the motor at higher than its rated voltage and frequency to obtain higher maximum rotational speed, provided the motor was physically capable of such high-speed operation. In this regard, the switched reluctance motor has a distinct advantage over the induction motor because the switched reluctance motor is able to operate at higher rotational speeds due to the physical simplicity of the motor rotor construction.

In addition, this limitation on the output voltage from the VSD limits the operating speed range of high speed motors, including high speed switched reluctance motors, in the chiller system. The high speed motors, used to obtain faster compressor speeds without the "step up" gearing arrangement, are limited because it is more difficult to design an efficient and cost-effective motor when only a limited voltage range is available. High speed switched reluctance motors are desirable in a chiller system because they are capable of higher efficiency, improved reliability, and lower cost, than other types of motors. In addition, the physical simplicity of the rotor construction of the switch reluctance motor lends itself to a higher degree of mechanical robustness, providing for ease of use in high speed applications.

Therefore, what is needed is a variable speed drive for a high speed switched reluctance motor that can provide a cost-effective, efficient and easily implemented operation of the high speed switched reluctance motor in a chiller system.

SUMMARY OF THE INVENTION

One embodiment of the present invention is directed to a drive system for a compressor of a chiller system. The drive system includes a variable speed drive and a switched reluctance motor. The variable speed drive is configured to receive an input AC power at a fixed AC input voltage and a fixed input frequency and provide an output power at a variable voltage and variable frequency. The variable voltage has a maximum voltage greater in magnitude than the fixed input AC voltage and the variable frequency has a maximum frequency greater than the fixed input frequency. The variable speed drive includes a converter stage connected to an AC power source providing the input AC power, a DC link connected to the converter stage, and an inverter stage connected to the DC link. The converter stage is configured to convert the fixed input AC voltage to a boosted DC voltage greater than the peak value of the fixed input AC voltage. The DC link is configured to filter the boosted DC voltage and store the energy from the converter stage. The inverter stage is configured to convert the boosted DC voltage from the DC link into the output power having the variable voltage and the variable frequency. The switched reluctance motor is connected to the inverter stage and powered by the output of the inverter stage. The switched reluctance motor is connectable to a compressor of a chiller system to power the compressor.

Another embodiment of the present invention is directed to a chiller system. The chiller system includes a compressor, a condenser, and an evaporator connected in a closed refrigerant loop, a switched reluctance motor connected to the compressor to power the compressor, and a variable speed drive connected to the switched reluctance motor. The variable speed drive is configured to receive an input AC power at a fixed input AC voltage and a fixed input frequency and provide an output power at a variable voltage and variable frequency to the switched reluctance motor. The variable voltage has a maximum voltage greater in magnitude than the fixed input AC voltage and the variable frequency has a maximum frequency greater than the fixed input frequency. The variable speed drive includes a converter stage connected to an AC power source providing the input AC power, a DC link connected to the converter stage, and an inverter stage connected to the DC link. The converter stage is configured to convert the input AC voltage to a boosted DC voltage. The boosted DC voltage is greater than the peak value of the fixed input AC voltage. The DC link is configured to filter the boosted DC voltage and store energy from the converter stage. The inverter stage is configured to convert the boosted DC voltage from the DC link into the output power for the switched reluctance motor having the variable voltage and the variable frequency.

One advantage of the present invention is increased system efficiency and potential cost reduction by eliminating gears between the motor and the compressor.

Another advantage of the present invention is a reduction in motor and inverter losses.

A further advantage of the present invention is improved reliability of the chiller system.

Another advantage of the present invention is improved input power quality in the variable speed drive.

Still another advantage of the present invention is that the variable speed drive has improved ride-through capabilities during input voltage sags.

A further advantage of the present invention is a higher maximum operating speed and a faster dynamic response of the motor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
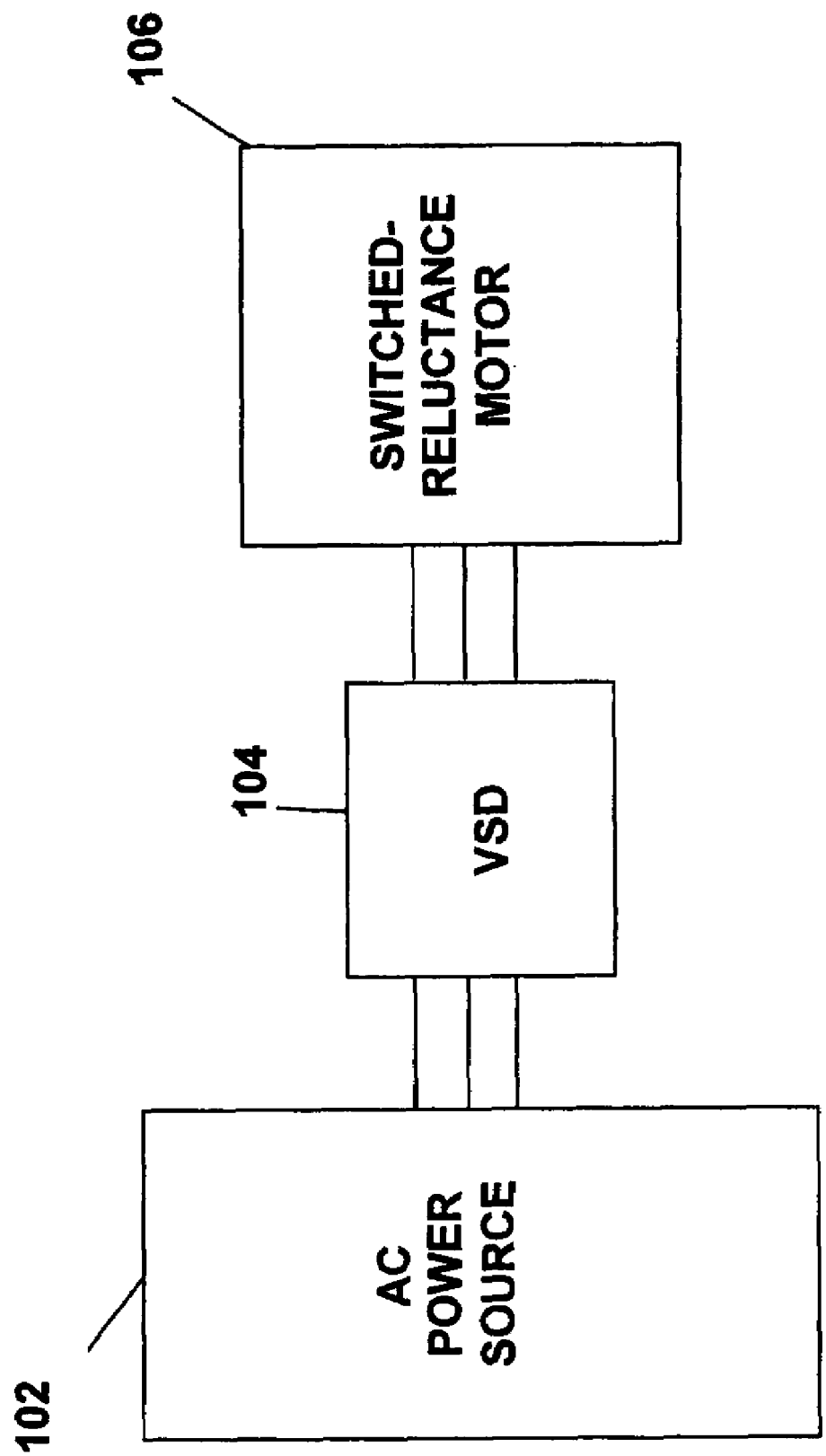
FIG. 1 illustrates schematically a general system configuration of the present invention.

FIG. 1 illustrates generally a system configuration of the present invention. An AC power source 102 supplies a variable speed drive (VSD) 104, which powers a switched reluctance (SR) motor 106. In another embodiment of the present invention, the variable speed drive 104 can power more than one switched reluctance motor 106. The SR motor 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V, at a line frequency of 50 Hz or 60 Hz, to the VSD 104 depending on the corresponding AC power grid.

The VSD 104 receives AC power having a particular fixed line voltage and fixed line frequency from the AC power source 102 and provides power to the SR motor 106 at a desired voltage and desired frequency, both of which can be varied to satisfy particular requirements. Power is delivered to the SR motor 106 in the form of voltage and current pulses. Voltage pulses consist of a positive voltage being applied to the SR motor's windings, and may also include a portion of negative voltage being applied to the SR motor's windings. Current pulses include only positive current flowing through the SR motor's windings. The exact shape of voltage and current pulses is dependent upon the kind of inverter being used for the SR motor 106, and how such inverter is controlled. The frequency of current and voltage pulses is generally proportional to the speed at which the SR motor 106 rotates, but its exact values depend on the number of stator phases and rotor poles inside the SR motor 106.

Figure 2:
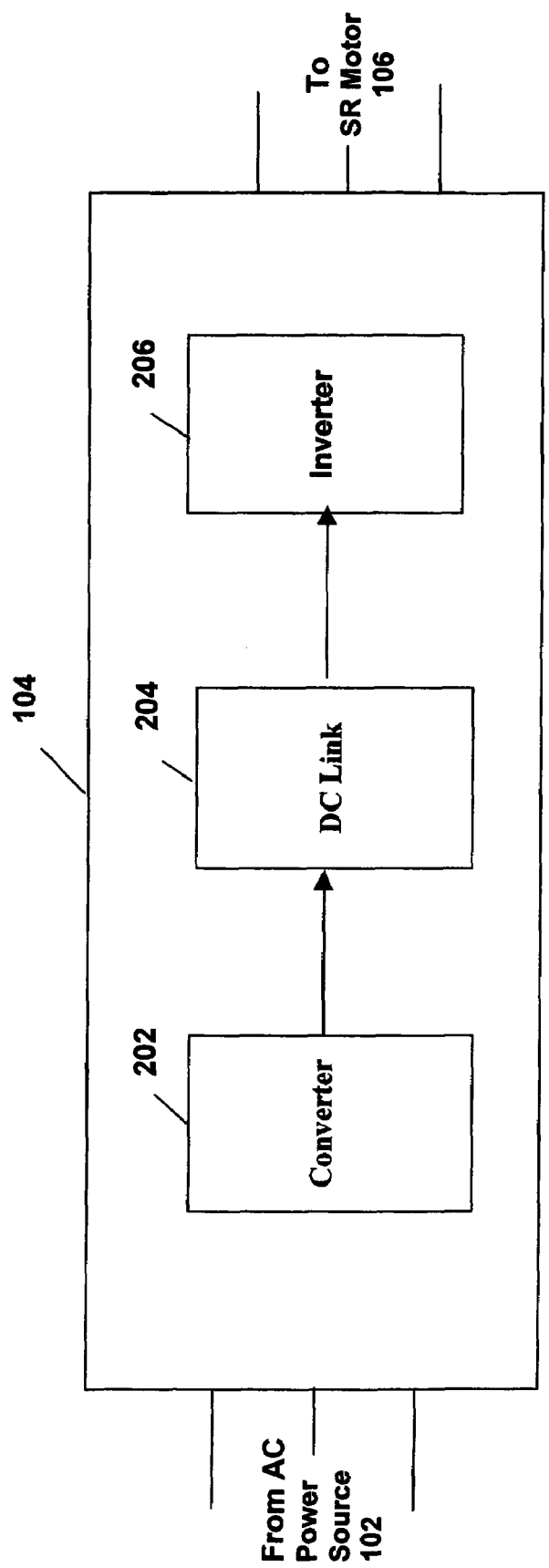
FIG. 2 illustrates schematically an embodiment of variable speed drive of the present invention.

FIG. 2 illustrates one embodiment of the VSD 104 of the present invention. The VSD 104 can have three stages: a converter stage 202, a DC link stage 204 and an output stage having an inverter(s) 206. The converter 202 converts the fixed line frequency, fixed line voltage AC power from the AC power source 102 into DC power. The DC link 204 filters the DC power from the converter 202 and provides energy storage components. The DC link 204 can be composed of capacitors and inductors, which are passive devices that exhibit high reliability rates and very low failure rates. The inverter 206 converts the DC power from the DC link 204 into variable frequency, variable voltage power for the SR motor 106. The inverter 206 can be a power module that can include power transistors, insulated gate bipolar transistor (IGBT) power switches and inverse diodes. Furthermore, it is to be understood that the DC link 204 and the inverter(s) 206 of the VSD 104 can incorporate different components from those discussed above so long as the DC link 204 and inverter(s) 206 of the VSD 104 can provide the SR motor 106 with appropriate output voltages and frequencies.

Figure 3:
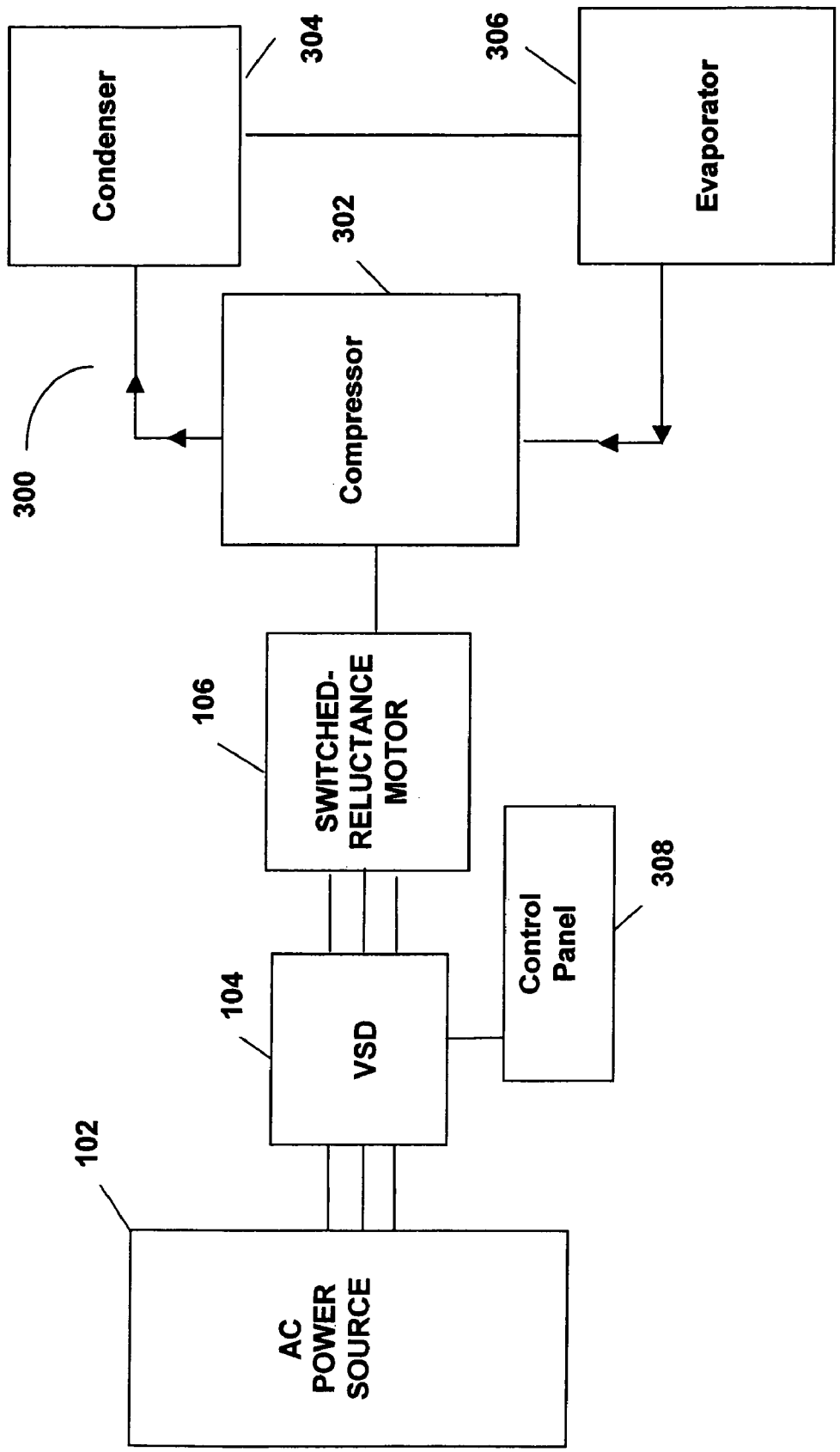
FIG. 3 illustrates schematically a refrigeration system that can be used with the present invention.

As shown in FIG. 3, the HVAC, refrigeration or liquid chiller system 300 includes a compressor 302, a condenser arrangement 304, a liquid chiller or evaporator arrangement 306 and the control panel 308. The compressor 302 is driven by the SR motor 106 that is powered by VSD 104. The VSD 104 receives AC power having a particular fixed line voltage and fixed line frequency from AC power source 102 and provides power to the SR motor 106 at desired voltages and desired frequencies, both of which can be varied to satisfy particular requirements. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104, as well as other components of the chiller system 300.

The SR motor 106 used in the system 300 can be any suitable type of high efficiency switched reluctance motor. In addition, the SR motor 106 should have a relatively flat efficiency vs. load curve due to the absence of any magnetizing current, which may be present in other types of motors. The relatively flat efficiency vs. load curve indicates that the efficiency of the SR motor 106 does not change significantly with changes in the load. Furthermore, each stator phase in the SR motor 106 is independent of the other stator phases in the SR motor 106. The independent stator phases in the SR motor 106 enable the SR motor 106 to continue to operate at a reduced power if one of the stator phases should fail.

Referring back to FIG. 3, compressor 302 compresses a refrigerant vapor and delivers the vapor to the condenser 304 through a discharge line. The compressor 302 is preferably a centrifugal compressor. However, it is to be understood that the compressor 302 can be any suitable type of compressor, e.g., screw compressor, reciprocating compressor, scroll compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to the evaporator 306.

The evaporator 306 includes connections for a supply line and a return line of a cooling load. A secondary liquid, e.g. water, ethylene, calcium chloride brine or sodium chloride brine, travels into the evaporator 306 via the return line and exits the evaporator 306 via the supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD or multiple VSDs connected into each of one or more refrigerant circuits.

Referring back to FIG. 2, the converter 202 can be a diode or thyristor rectifier coupled to a boost DC/DC converter to provide a boosted DC voltage to the DC link 204 in order to obtain an output voltage from the VSD 104 greater than the input voltage of the VSD 104. In another example, the converter 202 can be a pulse width modulated boost rectifier having insulated gate bipolar transistors (IGBTs) to provide a boosted DC voltage to the DC link 204 to obtain an output voltage from the VSD 104 greater than the input voltage of the VSD 104. In a preferred embodiment of the present invention, the VSD 104 can provide output frequencies that are at least twice the fixed frequency provided to the VSD 104 and the boosted DC Link 204 provides for both a higher maximum operating frequency and lower motor and drive losses than in the conventional motor drive for an SR motor. To be able to more efficiently use the boosted voltage from the VSD 104, the SR motor 106 preferably has a voltage rating that is greater than the fixed line voltage from the AC power source 102. However, the SR motor 106 can also have a voltage rating that is equal to or less than the fixed line voltage from the AC power source 102.

In addition to providing a boosted DC voltage to the DC link 204, the converter 202 can control the shape and phase angle of the current waveform that is drawn from the AC power source 102 to improve the input power quality of the VSD 104. The quality of the input power can be determined by evaluating two characteristics. One characteristic is the shape of the waveform of the currents drawn from the AC power source 102, where the closer or nearer the waveform shape is to the ideal sinusoid, the better the quality of the input power. The other characteristic is the power factor of the input power, i.e., the cosine of the phase angle between the supplied AC input voltage and the fundamental harmonic component of the current drawn from the AC power source 102, where the closer or nearer the power factor is to unity, the better the quality of the input power. The converter 202 is able to control the shape and phase angle of the current waveform drawn from the AC power source 102 such that the shape of the waveform is sinusoidal and in phase with the AC input voltage. Thus, the converter 202 enables the VSD 104 to have improved input power quality.

Furthermore, the converter 202 can be used to improve the ride-through capabilities of the VSD 104 during a decrease of the AC input voltage, also referred to as a voltage sag. The converter 202 can be controlled to provide a desired or predetermined output voltage to the DC link 204 that is substantially independent of the magnitude of the AC input voltage. By providing a DC voltage that is not dependent on the AC input voltage, the converter 202 (and VSD 104) is unaffected by voltage sags in the AC input voltage and thereby provides improved ride-through performance for the VSD 104. The converter 202 can continue to provide the desired DC voltage to the DC link 204 for a predetermined time period, even though the AC input voltage has sagged, until a maximum current limit is reached in the converter 202. This ride through capability of the converter 202 enables the VSD 104 to continue to operate without interruption during times when the AC input voltage sags.

Figure 4:
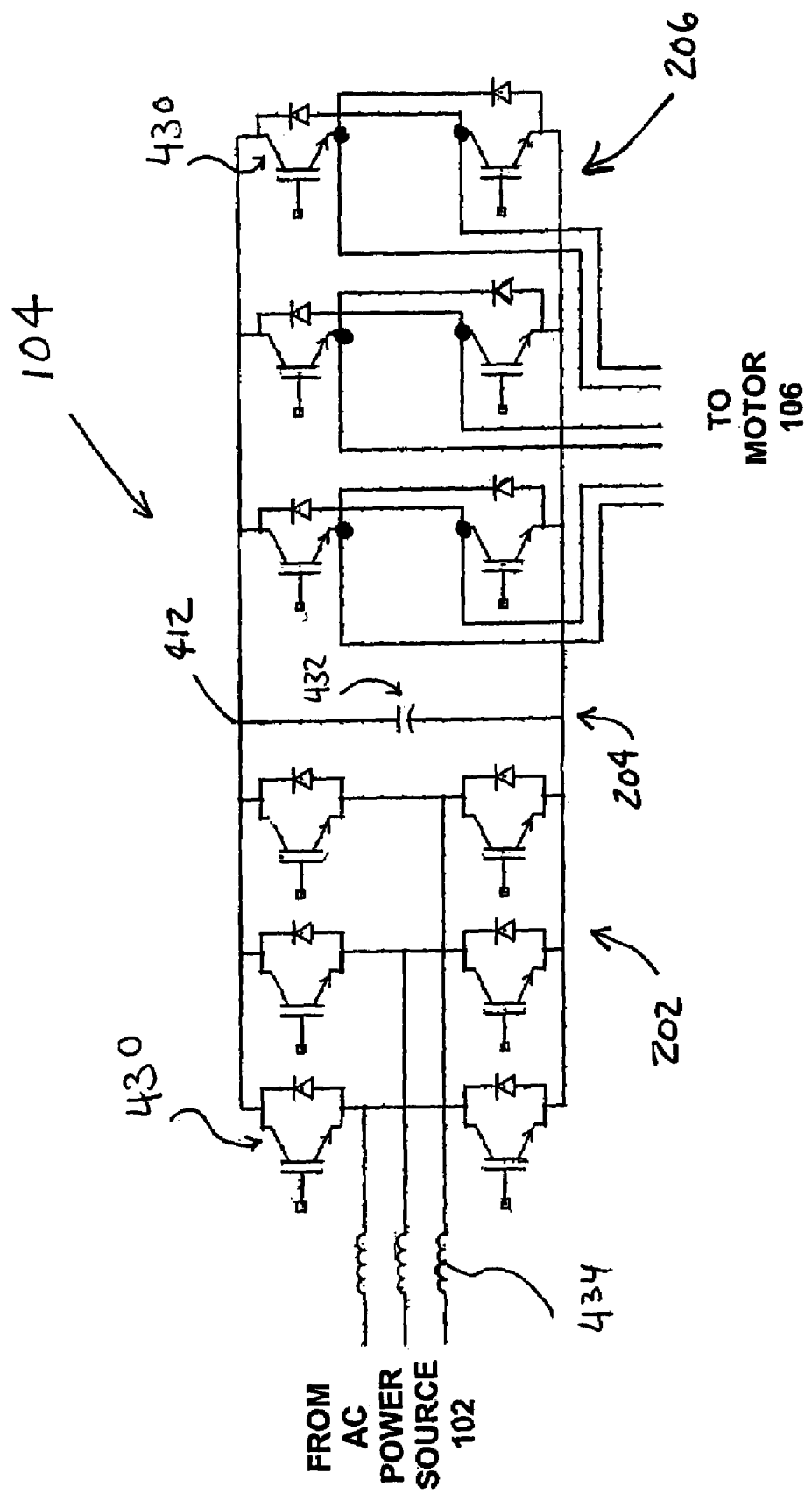
FIG. 4 illustrates a circuit diagram of one embodiment of the variable speed drive of the present invention.

FIG. 4 shows a circuit diagram for one embodiment of the VSD 104. In this embodiment of the VSD 104, the input lines from a three-phase AC power source 102 are connected to inductors 434 that are used to smooth the current in the corresponding line of the VSD 104. The output of each of the inductors 434 is then provided to the converter 202 to convert each phase of the input AC power to DC power. In addition, the VSD 104 can include additional components located upstream of the inductors 434 that are not shown in FIG. 4. For example, a circuit breaker can be included, which circuit breaker can disconnect the VSD 104 from the AC power source 102 when an excess current, voltage or power is provided to the VSD 104. The circuit breaker can be connected to an optional autotransformer. The autotransformer, when used, is preferably used to adjust an input voltage (either up or down) from the AC power source 102 to a desired input voltage. Finally, fuses for each line can be used to disconnect that input phase or line of the VSD 104 in response to an excessive current in that line.

The VSD 104 can also include a precharge system (not shown) that can control the rise of the DC link voltage from 0 V to the rated voltage to avoid a large inrush current that can be damaging to the components of the VSD 104. The precharge system can include a precharge contactor that is used to connect precharge resistors between the input AC power source 102 and the converter 202 or, sometimes, between the input AC power source 102 and the DC link 204. These precharge resistors limit the inrush current to a manageable level. After the precharge is completed, the precharge resistors are excluded from the circuit by opening the precharge contactor, and the input AC power source 102 is connected directly to the converter 202 by closing another contactor, referred to as the supply contactor. The supply contactor remains closed during the operation of the system.

The converter module 202 includes three pairs (one pair for each input phase) of power switches or transistors 430. The converter module 202 also includes the corresponding control connections (not shown for simplicity) to control the switching of the power switches 430. In a preferred embodiment of the converter module 202, the power switches are IGBT power switches that are controlled by a pulse width modulation technique to generate the desired output voltages for the DC link. Preferably, the converter module 202 can operate as a boost rectifier to provide a boosted DC voltage, i.e., a voltage greater than the peak value of the input AC voltage, to the DC link 204 to obtain an output voltage from the VSD 104 greater than the input voltage of the VSD 104.

Connected in parallel to the outputs of the converter 202 is the DC link 204. The DC link 204 in this embodiment includes capacitor(s) 432 and resistors (not shown) to filter the DC power and store energy from a DC bus 412. The resistors can function as voltage balancing devices to maintain a substantially equal DC link voltage between capacitor banks. The resistors can also function as charge depleting devices to "bleed off" stored voltage in the capacitor banks when the power is removed from the AC power source 102. Also connected to the DC bus 412 is an inverter section 206, which converts the DC power on the DC bus 412 to the power for the SR motor 106. In the embodiment shown in FIG. 4, one three-phase inverter section or module 206 is used to drive a three-phase SR motor. However, different numbers of phases are possible within each inverter module, depending on the number of phases in the SR motor. Also, additional inverter modules 206 can be added (to drive additional SR motors) and would have a similar circuit representation to the inverter module 206 shown in FIG. 4.

One embodiment of the inverter module 206 includes three pairs (one for each output phase) of insulated gate bipolar transistor (IGBT) power switches 430 and diodes. Each stator phase winding for the SR motor 106 is connected between an upper and a lower IGBT power switch in one inverter leg. The diodes in the same inverter leg assure that the positive current established in an SR motor's winding has a path to flow when IGBT switch(es) are turned off. The series connection of the two IGBT switches in each leg of the inverter 206 with a phase winding of the SR motor 106 prevents the occurrence of an inverter shoot through, which is a situation where both IGBT power switches 430 in the pair of IGBT power switches are conductive at the same time and connected directly across the DC link, thus resulting in an excessive current in the inverter 206. The inverter modules 206 also include the corresponding control connections (not shown for simplicity) to control the switching of the IGBT power switches 430. As it is known in the art of SR motors, there exist other possible embodiments of the inverter for an SR motor, where switches and diodes differ in number and are connected in manner different from the one described above, which could be used in the place of inverter 206 shown in FIG. 4.

The inverter module 206 converts the DC power on the DC bus 412 to the power required by the SR motor by selectively switching each of the IGBT power switches 430 in the inverter module 206 between an "on" or activated position and an "off" or deactivated position using a modulation scheme to obtain the desired voltage pulses at a desired frequency from the inverter module 206. A gating signal or switching signal is provided to the IGBT power switches 430 by the control panel 308, based on the modulation scheme, to switch the IGBT power switches 430 between the "on" position and the "off" position. The IGBT power switches 430 are preferably in the "on" position when the switching signal is "High," i.e., a logical one, and in the "off" position when the switching signal is "Low," i.e., a logical zero. However, it is to be understood that the activation and deactivation of the IGBT power switches 430 can be based on the opposite state of the switching signal.

One aspect of the control of the SR motor 106 involves the establishment of current in the stator phase windings of the SR motor 106 as soon as possible after the issuance of a control signal at a given point in time. However, the stator phase winding of the SR motor 106 operates similar to an inductor, i.e., it opposes the rise of current in the stator phase winding, while the current is being established in the stator phase winding. The ability of the VSD 104, and specifically the inverter 206, to provide a boosted voltage to the SR motor 106 results in the ability to operate the motor at a higher maximum speed and provides for a better dynamic response of the SR motor 106 when compared to a motor that does not receive a boosted voltage. The application of the boosted voltage to the SR motor 106 results in the current rising and falling more rapidly in the stator phase winding (the rate of rise of current is proportional to the magnitude of the voltage pulse being applied) and, thus, in the quicker establishment and extinction of a motoring torque developed between a stator winding and a rotor pole inside the SR motor. This results in a higher maximum operating speed and improved and quicker control, i.e., better dynamic response (e.g. faster acceleration/deceleration), of the SR motor 106.

By providing a boosted output voltage to the SR motor 106 with the inverter 206, the magnitude of the RMS value of motor current is reduced, which motor current is approximately inversely proportional to the output voltage for a given motor power rating. This reduction in motor current results in a reduction of motor losses for the SR motor 106, which motor losses are approximately proportional to the square of the magnitude of the motor current. The reduction of motor losses in the SR motor 106 results in increased efficiency for the chiller system 300.

Similarly, by providing a boosted DC voltage to the DC link 204 with the converter 202, the magnitude of the DC current into the inverter 206 is reduced, which inverter current is approximately inversely proportional to the DC input voltage of the inverter 206 for a given system power rating. This reduction in inverter current results in a reduction of inverter losses for the VSD 104. The reduction of inverter losses in the VSD 104 results in increased efficiency for the chiller system 300.

Finally, the ability of the VSD 104 to boost the DC link voltage independently of the line voltage, permits the VSD 104 to be operated on a variety of foreign and domestic power grids without having to alter the motor 106 for different power sources.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drive system for a compressor of a chiller system, the drive system comprising:
  a variable speed drive, the variable speed drive being configured to receive an input AC power at a fixed input AC voltage and a fixed input frequency and provide an output power at a variable voltage and variable frequency, the variable voltage having a maximum voltage greater in magnitude than the fixed input AC voltage and the variable frequency having a maximum frequency greater than the fixed input frequency, the variable speed drive comprising:
- a pulse width modulated boost rectifier having insulated gate bipolar transistors connected to an AC power source providing the input AC power, the pulse width modulated boost rectifier being configured to convert the fixed input AC voltage to a boosted DC voltage, the boosted DC voltage being greater than the fixed input AC voltage;
- a DC link connected to the pulse width modulated boost rectifier, the DC link being configured to filter the boosted DC voltage and store energy from the pulse width modulated boost rectifier; and
- an inverter stage connected to the DC link, the inverter stage having a plurality of inverter legs, each inverter leg of the plurality of inverter legs including a first insulated gate bipolar transistor (IGBT) power switch and a second IGBT power switch, the inverter stage being configured to convert the boosted DC voltage from the DC link into the output power having the variable voltage and the variable frequency; and
- a switched reluctance motor having a plurality of stator windings, each stator winding of the plurality of stator windings connected in series between the inverter leg first and second IGBT power switches of the inverter stage and powered by the output power from the inverter stage, the switched reluctance motor being connectable to a compressor of the chiller system to power the compressor.

2. The drive system of claim 1 wherein the boosted DC voltage is a DC voltage greater than 1.3 times the root-mean-squared value of the fixed AC input voltage.

3. The drive system of claim 1 wherein the pulse width modulated boost rectifier comprises:
- a three-phase rectifier; and
- a DC-DC boost converter connected to the rectifier, the DC-DC boost converter being configured and disposed to provide the boosted DC voltage to the DC link.

4. The drive system of claim 1 wherein the switched reluctance motor has a voltage rating greater than the fixed input AC voltage.

5. The drive system of claim 1 wherein the pulse width modulated boost rectifier is configured to control a current waveform drawn from the AC power source to have a substantially sinusoidal shape and to be substantially in phase with the fixed input AC voltage.

6. The drive system of claim 1 wherein the pulse width modulated boost rectifier is configured to provide the boosted DC voltage to the DC link substantially independent of the fixed input AC voltage, thereby permitting the variable speed drive to operate during a reduction in the fixed input AC voltage for a predetermined time.

7. The drive system of claim 1 wherein the inverter stage is configured to have a DC current of reduced magnitude in response to the boosted DC voltage being present at the DC link, thereby reducing inverter losses in the variable speed drive.

8. The drive system of claim 1 wherein the switched reluctance motor is configured to have a motor current having a RMS value of reduced magnitude in response to the variable voltage being greater the fixed input AC voltage, thereby reducing motor losses in the switched reluctance motor.

9. The drive system of claim 1 wherein the switched reluctance motor is configured to have a reduced time for establishment and extinction of a motoring torque in response to the variable voltage being greater in magnitude than the fixed input AC voltage.

10. A chiller system comprising:
- a compressor, a condenser, and an evaporator connected in a closed refrigerant loop;
- a switched reluctance motor connected to the compressor to power the compressor; and
- a variable speed drive connected to the switched reluctance motor, the variable speed drive being configured to receive an input AC power at a fixed input AC voltage and a fixed input frequency and provide an output power at a variable voltage and variable frequency to the switched reluctance motor, the variable voltage having a maximum voltage greater in magnitude than the fixed input AC voltage and the variable frequency having a maximum frequency greater than the fixed input frequency, the variable speed drive comprising:
  - a pulse width modulated boost rectifier having insulated gate bipolar transistors connected to an AC power source providing the input AC power, the pulse width modulated boost rectifier being configured to convert the fixed input AC voltage to a boosted DC voltage, the boosted DC voltage being greater than the fixed input AC voltage;
  - a DC link connected to the pulse width modulated boost rectifier, the DC link being configured to filter the boosted DC voltage and store energy from the pulse width modulated boost rectifier;
  - an inverter stage connected to the DC link, the inverter stage having a plurality of inverter legs, each inverter leg of the plurality of inverter legs including a first insulated gate bipolar transistor (IGBT) power switch and a second IGBT power switch, the inverter stage being configured to convert the boosted DC voltage from the DC link into the output power having the variable voltage and the variable frequency; and
- a switched reluctance motor having a plurality of stator windings, each stator winding of the plurality of stator windings connected in series with one of the inverter leg first and second IGBT power switches of the inverter stage and powered by the output power from the inverter stage, the switched reluctance motor being connectable to a compressor of the chiller system to power the compressor.

11. The chiller system of claim 10 wherein the boosted DC voltage is a DC voltage greater than 1.3 times the root-mean-squared value of the fixed AC input voltage.

12. The chiller system of claim 10 wherein the pulse width modulated boost rectifier comprises:
- a three-phase rectifier connected to an AC power source; and
- a DC-DC boost converter connected to the rectifier, the DC-DC boost converter being configured and disposed to provide the boosted DC voltage to the DC link.

13. The chiller system of claim 10 wherein the switched reluctance motor has a voltage rating greater than the fixed input AC voltage.

14. The chiller system of claim 10 wherein the pulse width modulated boost rectifier is configured to control a current waveform drawn from the AC power source to have a substantially sinusoidal shape and to be substantially in phase with the fixed input AC voltage.

15. The chiller system of claim 10 wherein the pulse width modulated boost rectifier is configured to provide the boosted DC voltage to the DC link substantially independent of the fixed input AC voltage, thereby permitting the variable speed drive to operate during a reduction in the fixed input AC voltage for a predetermined time.

16. The chiller system of claim 10 wherein the switched reluctance motor is configured to have a motor current having a RMS value of reduced magnitude in response to the variable voltage being greater in magnitude than the fixed input AC voltage, thereby reducing motor losses in the switched reluctance motor.

17. The chiller system of claim 10 wherein the inverter stage is configured to have a DC current of reduced magnitude in response to the boosted DC voltage being present at the DC link, thereby reducing inverter losses in the variable speed drive.

18. The drive system of claim 10 wherein the switched reluctance motor is configured to have a reduced time for establishment and extinction of a motoring torque in response to the variable voltage being greater in magnitude than the fixed input AC voltage.

* * * * *

UNITED STATES PATENT AND TRADEMARK OFFICE
CERTIFICATE OF CORRECTION

| | | |
|---|---|---|
| PATENT NO. | : 7,202,626 B2 | Page 1 of 1 |
| APPLICATION NO. | : 11/123756 | |
| DATED | : April 10, 2007 | |
| INVENTOR(S) | : Jadric et al. | |

It is certified that error appears in the above-identified patent and that said Letters Patent is hereby corrected as shown below:

On the Title Page, field (56), "4,670,695" should be --4,670,696--

Signed and Sealed this

Twenty-first Day of August, 2007

JON W. DUDAS
*Director of the United States Patent and Trademark Office*